(12) United States Patent
Schmidt

(10) Patent No.: US 10,885,664 B1
(45) Date of Patent: Jan. 5, 2021

(54) AIRCRAFT COMPONENT TRACKING USING IMAGE DATA

(71) Applicant: LOCKHEED MARTIN CORPORATION, Bethesda, MD (US)

(72) Inventor: Timothy Schmidt, Port St Lucie, FL (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

(21) Appl. No.: 16/585,058

(22) Filed: Sep. 27, 2019

(51) Int. Cl.
| | |
|---|---|
| *G06T 7/73* | (2017.01) |
| *G06T 7/50* | (2017.01) |
| *G06T 7/80* | (2017.01) |
| *B64D 45/00* | (2006.01) |
| *B64D 47/08* | (2006.01) |
| *H04N 5/225* | (2006.01) |

(52) U.S. Cl.
CPC ............ *G06T 7/73* (2017.01); *B64D 45/0005* (2013.01); *B64D 47/08* (2013.01); *G06T 7/50* (2017.01); *G06T 7/80* (2017.01); *H04N 5/2253* (2013.01); *G06T 2207/30252* (2013.01)

(58) Field of Classification Search
CPC ................................... G06T 7/73; G06T 7/80
See application file for complete search history.

(56) References Cited

U.S. PATENT DOCUMENTS

| | | | |
|---|---|---|---|
| 9,784,572 B2 | 10/2017 | Hocquette | |
| 2010/0063767 A1* | 3/2010 | Moir | B64C 27/008 702/150 |

FOREIGN PATENT DOCUMENTS

| | | | | |
|---|---|---|---|---|
| EP | 3333071 A1 * | 6/2018 | ........... | B64C 27/008 |
| WO | 2012021202 A2 | 2/2012 | | |

* cited by examiner

*Primary Examiner* — Girumsew Wendmagegn
(74) *Attorney, Agent, or Firm* — Michael Best & Friedrich LLP

(57) ABSTRACT

A method of monitoring a location of a component of an aircraft includes acquiring an image of the component during flight by an imaging device disposed at a selected location relative to the aircraft and oriented along a selected direction relative to an aircraft structure, identifying a position of the component within the image, estimating a distance in the image between the component and a reference location depicted in the image, and estimating an actual location of the component based on the distance in the image. Estimating the actual location includes correlating the distance in the image with an actual distance between the component and the reference location.

20 Claims, 4 Drawing Sheets

AIRCRAFT COMPONENT TRACKING USING IMAGE DATA

STATEMENT OF FEDERAL SUPPORT

This invention was made with government support under 70MI07634 awarded by the United States Army (UAE Weapons). The government has certain rights in the invention.

BACKGROUND

The present disclosure relates to the art of aircraft operation, and more particularly, to monitoring blade position and/or position of other aircraft components.

Many modern helicopters and some fixed wing aircraft include rotor blades (e.g., helicopter rotor blades). In some instances, aircraft components such as rotor blades can deviate from their desired position during flight or operation. For example, helicopter blades can exhibit flapping behavior, which can cause the blades to interfere with other helicopter components, resulting in sub-optimal performance and/or damage.

BRIEF DESCRIPTION

According to one or more embodiments, a method of monitoring a location of a component of an aircraft includes acquiring an image of the component during flight by an imaging device disposed at a selected location relative to the aircraft and oriented along a selected direction relative to an aircraft structure, identifying a position of the component within the image, estimating a distance in the image between the component and a reference location depicted in the image, and estimating an actual location of the component based on the distance in the image. Estimating the actual location includes correlating the distance in the image with an actual distance between the component and the reference location.

In addition to one or more of the features described above, or as an alternative, the image is an optical image taken by a camera disposed at the aircraft.

In addition to one or more of the features described above, or as an alternative, the distance in the image corresponds to a number of pixels along a line connecting the component and the reference location.

In addition to one or more of the features described above, or as an alternative, the reference location is a location in the image of an image feature representing a clearance region in a field of view of the imaging device.

In addition to one or more of the features described above, or as an alternative, the reference location is a location of structural component of the aircraft.

In addition to one or more of the features described above, or as an alternative, the method further includes performing a calibration with the imaging device prior to takeoff of the aircraft.

In addition to one or more of the features described above, or as an alternative, the calibration includes taking a reference image by the imaging device when the imaging device is at the selected location and is oriented along the selected direction, and correlating pixel width to an actual distance value.

In addition to one or more of the features described above, or as an alternative, the method further includes controlling operation of the aircraft based on the actual distance.

In addition to one or more of the features described above, or as an alternative, the aircraft is a helicopter, the component is a rotor blade, and the position of the component in the image is a position of a blade tip during rotation of the rotor blade.

In addition to one or more of the features described above, or as an alternative, the reference location is a location of at least one of a structural component of the aircraft and a selected clearance region depicted by the image.

According to one or more embodiments, a system for monitoring a location of a component of an aircraft includes a processor and memory coupled to the processor and including computer-executable instructions that, when executed by the processor, cause the processor to acquire an image of the component during flight by an imaging device disposed at a selected location relative to the aircraft and oriented along a selected direction relative to an aircraft structure, identify a position of the component within the image, estimate a distance in the image between the component and a reference location depicted in the image, and estimate an actual location of the component based on the distance in the image. Estimating the actual location includes correlating the distance in the image with an actual distance between the component and the reference location.

In addition to one or more of the features described above, or as an alternative, the image is an optical image taken by a camera disposed at the aircraft.

In addition to one or more of the features described above, or as an alternative, the distance in the image corresponds to a number of pixels along a line connecting the component and the reference location.

In addition to one or more of the features described above, or as an alternative, the reference location is a location in the image of an image feature representing a clearance region in a field of view of the imaging device.

In addition to one or more of the features described above, or as an alternative, the reference location is a location of structural component of the aircraft.

In addition to one or more of the features described above, or as an alternative, the processor is configured to perform a calibration with the imaging device prior to takeoff of the aircraft.

In addition to one or more of the features described above, or as an alternative, the calibration includes taking a reference image by the imaging device when the imaging device is at the selected location and is oriented along the selected direction, and correlating pixel width to an actual distance value.

In addition to one or more of the features described above, or as an alternative, the processing device is configured to perform at least one of controlling operation of the aircraft and notifying a human operator based on the actual distance.

In addition to one or more of the features described above, or as an alternative, the aircraft is a helicopter, the component is a rotor blade, and the position of the component in the image is a position of a blade tip during rotation of the rotor blade.

In addition to one or more of the features described above, or as an alternative, the reference location is a location of at least one of a structural component of the aircraft and a selected clearance region depicted by the image.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
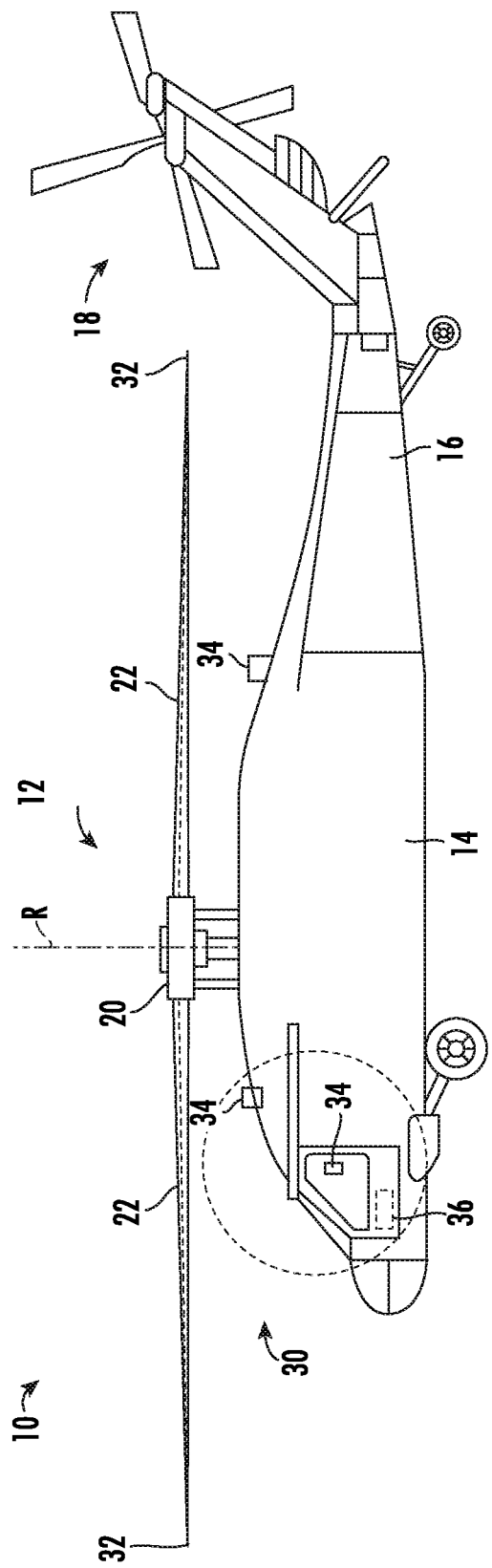
FIG. 1 depicts a rotary wing aircraft including components of a blade track monitoring system, in accordance with an exemplary embodiment.

FIG. 1 schematically illustrates an example of a rotary wing aircraft 10 having a main rotor assembly 12. The aircraft 10 includes an airframe 14 having an extending tail 16 which mounts a tail rotor system 18. The main rotor assembly 12 includes a plurality of rotor blades 22 mounted to a rotor hub assembly 20. The main rotor assembly 12 is driven about an axis of rotation R through a main gearbox by one or more engines.

Although a particular helicopter configuration is illustrated and described in this example, embodiments described herein are not so limited, and can be utilized in conjunction with any aircraft or vehicle that utilizes rotor blades. Examples of such aircraft include high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts.

A monitoring system is provided for monitoring or tracking a position of an aircraft component during operation. In one embodiment, referring again to FIG. 1, the aircraft 10 includes and/or is connected to a monitoring system 30 configured to track the location of an aircraft component, such as a rotor blade 22, during operation of the aircraft 10. For example, the monitoring system 30 monitors the location of an end of each rotor blade 22, referred to herein as a blade tip 32. The location of the blade tip 32 may include an axial location relative to the rotor blades' axis of rotation R and/or location (e.g., clearance between blades) in a radial direction perpendicular to the axis of rotation R. Location monitoring may be used to monitor, for example, blade clearance relative to locations or regions along a selected vector extending from the aircraft 10, such as a targeting vector or direction. Such regions are regions that should not be interfered with or intersected by the rotary blades 22 (or other monitored component) during flight or during a particular aircraft operation, and are referred to as herein as "clearance regions." Location monitoring may also be used to monitor blade location (clearance) relative to the aircraft structure (e.g., the airframe 14 and/or the tail 16) or other components of the aircraft 10. In one embodiment, the monitoring system 30 is applicable to rotary wing aircraft including single main rotor helicopters and coaxial helicopters.

The monitoring system 30 includes one or more imaging devices 34 mounted on or disposed in the aircraft 10. In one embodiment, the imaging device 34 is an optical camera configured to take optical images. The imaging device 34 may be any suitable device that can generate an image, such as a radar device, a LIDAR device, an infrared device and others.

Each imaging device 34 is located at a selected position on or in the aircraft 10, and has a selected orientation. The position and/or orientation may be fixed relative to an aircraft structure or component, such as the airframe 14 (e.g., on the tail, on the top, bottom or side of the aircraft). Alternatively, or in addition, one or more imaging devices 34 may be placed within the aircraft 10. For example, an imaging device 34 may be mounted within the cockpit and oriented toward a selected direction to take images of a region near the aircraft 10.

Each imaging device 34 may have a fixed position and/or orientation, or may have a variable position and/or orientation. One or more cameras can be fixedly mounted on or in the aircraft 10, and have a fixed orientation or an orientation that can be changed by an aircraft system, a human operator and/or the monitoring system 30. For example, an imaging device 34 may be a scanning camera and/or a helmet-mounted camera. Using a helmet-mounted camera and taking images may include tracking the pilot head, for example, with 6 degrees of freedom (x, y, and z coordinate locations, pitch, roll, and yaw of the head).

The monitoring system 30 also includes a processing device 36 disposed in the aircraft 10 or otherwise configured to acquire image data generated by an imaging device 34. The processing device 36 is configured to estimate a location of a component of the aircraft by analyzing an image to identify a position of the component in the image (e.g., a frame generated by the imaging device 32). The position of a component within the image is referred to herein as an "image position." As shown in FIG. 1, the component may be a rotary blade 22 or the blade tip 32, but is not so limited and can be any selected aircraft component, such as a section of the fuselage, a tail section, a fixed wing, etc.

In one embodiment, the actual location of the component (e.g., the blade tip 32) is determined based on a comparison of the image position of the component to a reference position in the image. The reference position is a stationary position within the field of view of an imaging device 34 at a given location and orientation. An orientation refers to a direction along which the imaging device 34 is pointed to take an image. The reference position can be determined by taking a calibration image with the imaging device 34 at the location and orientation when the aircraft 10 is on the ground. For example, if the monitored component is a rotary blade 22, the imaging device 34 is oriented so that at least the blade tip 32 is in the field of view of the imaging device 34, and a reference image is taken while the aircraft is on the ground and the blades 22 are rotating.

In one embodiment, the reference position is calibrated (to correlate an actual location and orientation of the reference position) by taking a reference image with the imaging device of an object or feature at a known distance, location and/or orientation. For example, a laser (or multiple lasers) is mounted to the aircraft 10 at a known location with a known azimuth and elevation. The laser may be a pre-existing laser, such as a targeting laser or a laser that is part of an inertial navigation system, and/or a laser mounted to the aircraft 10 for the purpose of calibration. The laser or lasers are projected onto a board or other surface that is aligned with the blade tip (or whatever component is to be monitored) using, for example, a plum bob.

The image position of a component can be correlated to actual position by analyzing the calibration image and/or a subsequent image. For example, pixel distance can be correlated with actual distance in the imaging device field of view. The correlation can be established, for example, by performing a calibration using the calibration image.

Correlation of pixel distance with axial distance, in one embodiment, is accomplished by positioning an object with a known height and/or width in a field of view of the imaging device 34. For example, an end of a yard stick or other object with height marks is disposed at a point of interest (e.g., the top of a fuselage) and plummed vertically on top of the point of interest. The distance measured using the object can then be used to calibrate pixel distance. If it is desired to calibrate with respect to a path such as an arc of interest, the object can be placed at several points along the arc to get a calibration measurement for the whole arc. It is noted that other calibration information can be acquired in a similar manner, such as distance from the imaging device 34.

To determine the actual location of a component, an image acquired during flight can be compared to a reference position in the acquired image. In one embodiment, the reference position is a position in the acquired image that corresponds to the position of the component in a calibration image. In another embodiment, the reference position is the position in the image of another aircraft component. For example, if the component is a blade tip 32, the reference position can be a position in the image of a surface of the tail 16. This allows the monitoring system 30 and/or a human user (e.g., an operator in the aircraft or a person monitoring the aircraft remotely) to monitor the distance between the tail 16 and the blade tip 32. In another example, the reference position is the position or track of the blade tip 32 in a calibration image taken by the imaging device 34 prior to take-off.

Figure 2:
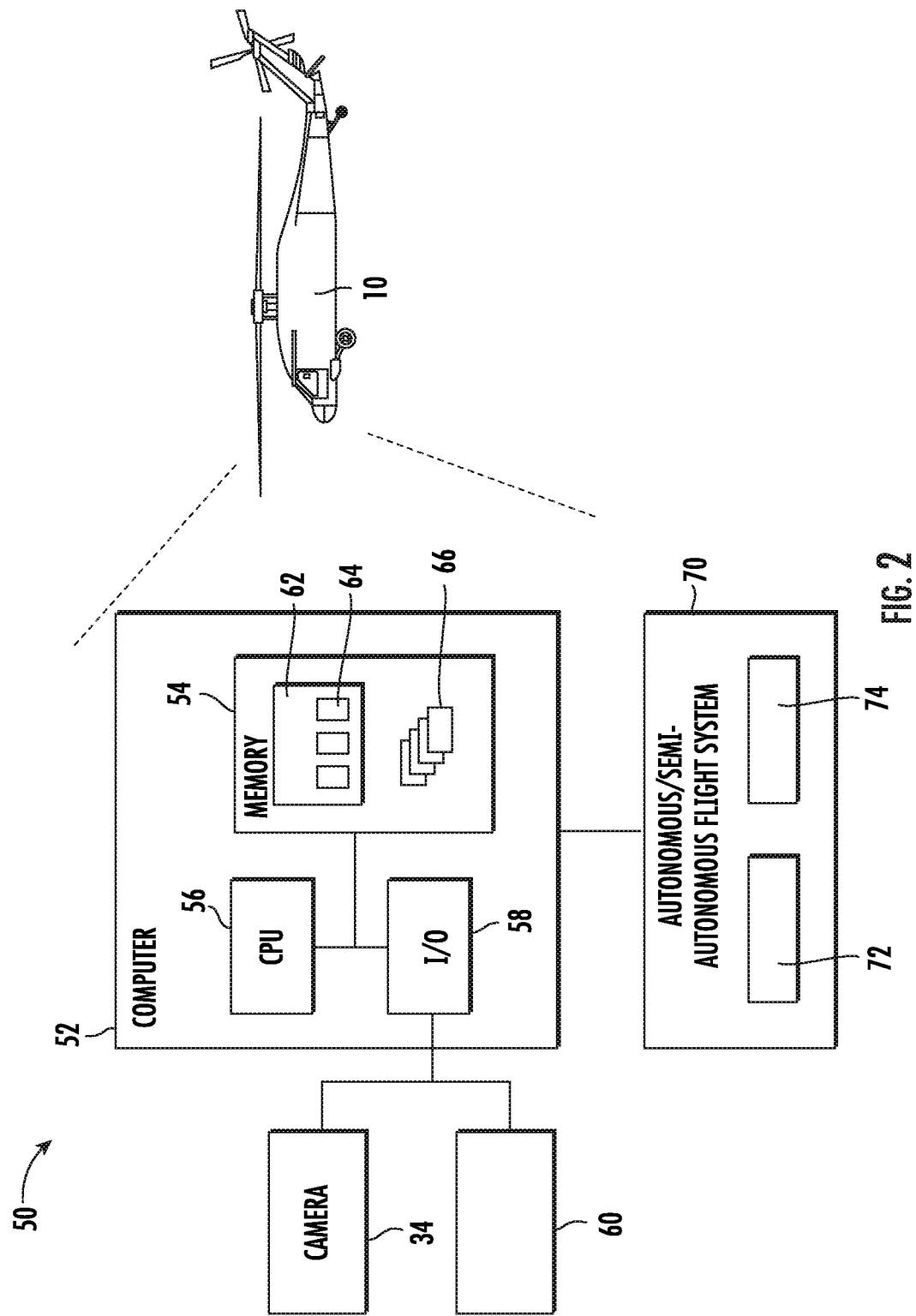
FIG. 2 depicts a schematic diagram of a monitoring system configured to monitor the position of an aircraft component, such as a rotary blade, in accordance with an embodiment.

FIG. 2 illustrates an example of a control system 50 of an aircraft, such as aircraft 10. The control system 50 includes aspects of the monitoring system 30, and can support manual, semi-autonomous and/or fully autonomous aircraft control capabilities.

The control system 50 includes a computer 52 having a memory 54 and a processor 56. The computer 52 also includes an input/output (I/O) device 58 coupled to various external devices, such as a microphone, headset, keyboard, pilot controls and others. For example, the I/O device 58 is connected to a display 60. The I/O device 58 is also connected to an imaging device 34 or multiple imaging devices 34 having selected aircraft positions and orientations.

The processor 56 can be any type or combination of computer processor, such as a microprocessor, microcontroller, digital signal processor, application specific integrated circuit, programmable logic device, and/or field programmable gate array, and may be configured as a central processing unit (CPU) and/or a graphics processing unit (GPU). The memory 54 can include volatile and non-volatile memory, such as random access memory (RAM), read only memory (ROM), or other electronic, optical, magnetic, or any other computer readable storage medium onto which data and control logic as described herein are stored. Therefore, the memory 54 is a tangible storage medium where instructions executable by the processor 56 are embodied in a non-transitory form.

The memory 54 may include at least one program product having a set (e.g., at least one) of program modules that are configured to carry out functions described herein. For example, a program/utility 62, having a set (at least one) of program modules 64, may be stored in the memory 54. The program modules 64 may generally carry out the functions and/or methodologies of embodiments as described herein.

The memory 54 may also store data in various data structures. For example, the memory 54 stores data files 66 or other structures to store data such as images, calibration data and/or location data of monitored aircraft components.

As discussed further below, the monitoring system 30 can be utilized by a human operator (e.g., a pilot, copilot or other crew member) or a processing device to control the aircraft 10 based on position estimation. For example, the control system 50 can output location information via graphical and/or textual information on the display 60 to allow the pilot to control aircraft operation (e.g., speed, flight path, maneuvers, etc.) to mitigate instances where the location information indicates that the blades 22 are in danger of impacting the aircraft structure or interfering with a target region or clearance region.

In one embodiment, the control system 50 includes an autonomous or semi-autonomous flight system 70 configured to autonomously control the aircraft 10 (e.g., speed, heading, bank angle, altitude, etc.). The flight system 70 can include autopilot software 72 executed by processors 74 in communication with the monitoring system 30. The autopilot software may generate commands or input for flying the aircraft 10 based on location information generated by the monitoring system 30.

Figure 3:
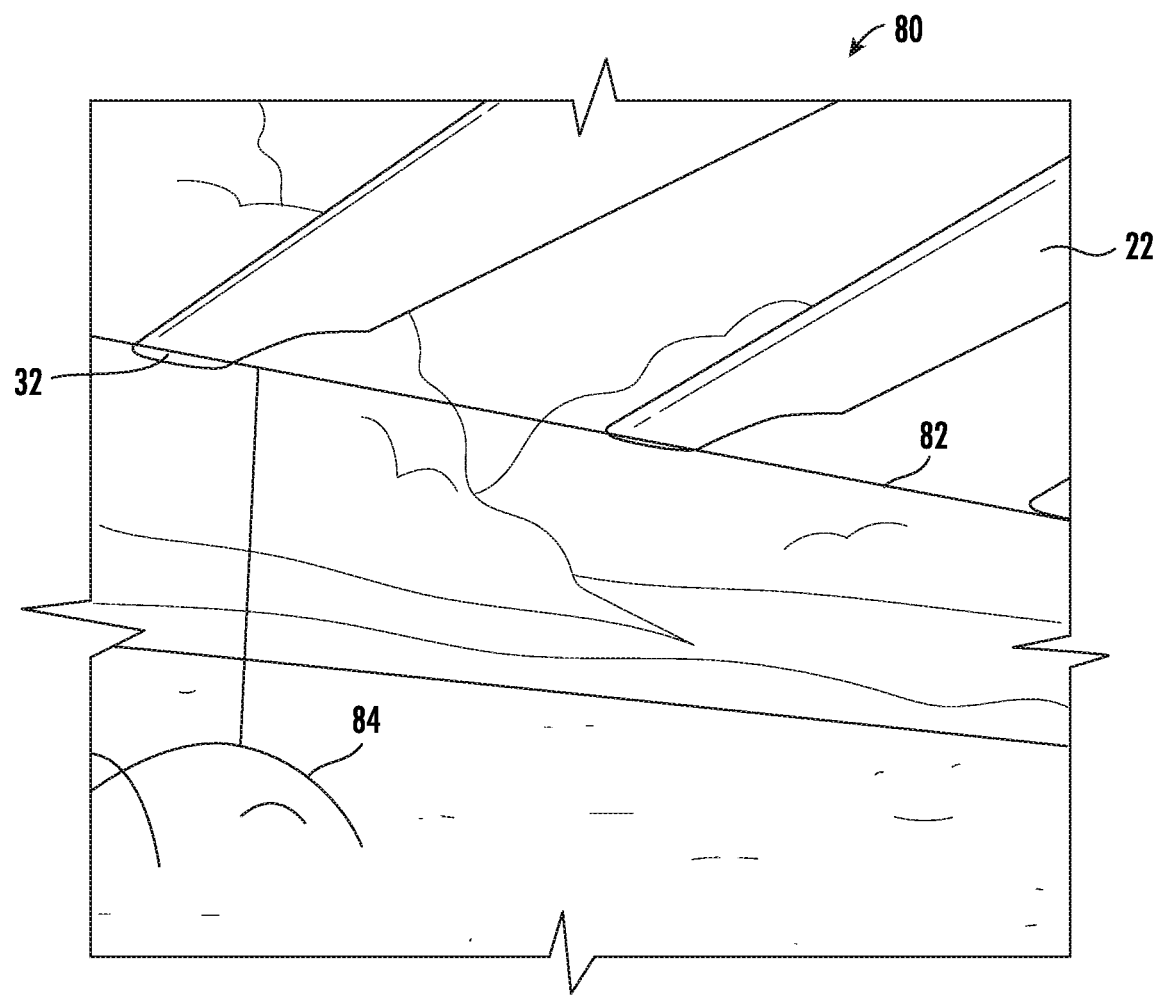
FIG. 3 depicts an example of an image generated by the monitoring system of FIG. 2, and depicts aspects of position estimation.

FIG. 3 depicts an example of an image 80 taken by an imaging device 34 during flight. In this example, the imaging device 34 is a high framerate camera configured to stream a high framerate video. Also in this example, the image 80 is a video frame taken during flight. The camera can be mounted in a fixed location within the aircraft cockpit, or mounted at an external location on the aircraft. The image 80 and/or the video streams can be transmitted to, for example, a helmet mounted display for pilots and crew to be used for increasing situational awareness. The blade position may be transmitted to the pilot, for example, as a still image showing a blade position and/or blade path relative to a reference position, or as a video stream showing the blade position and/or blade path.

A processing device acquires the image 80 and can determine actual position and distance relative to a reference location or a reference path. The actual position or distance is based on a calibration performed on the ground prior to flight, which correlates distance within the image 80 (image distance) with an actual distance. The calibration results in, for example, a correlation between pixel distance and the distance at the blade tip 32 location, which is used by the processing device to translate pixel distance and actual distance.

In this example, the processing device uses image analysis to identify blade tips within the image. As shown, the blade tips are identified as an object and given a tag, label or other graphical representation in the image 80. For example, the position of the blade tips 32 in the image 80 are represented by an arc 82 corresponding to the edge of the rotor assembly.

The processing device compares the image position of the arc 82 to an image position of a reference location depicted in the image 80. In this example, the reference location is a clearance region represented by a clearance cone 84. The distance between the blade tips (represented by the arc 82) and a reference location may be determined in real time by the processing device. As discussed above, the reference location can be the location of an aircraft component or structure, or another location in the image representing a region of space that is desired to remain clear of the blades.

The reference location may be represented by a graphical representation superimposed on the image. In this example, the graphical representation is a graphic of a clearance cone 84. The processing device monitors the blade position by estimating a distance between the arc 82 and the clearance cone 84 within the image. Based on a previous calibration, the distance in the image 80 is correlated with an actual distance therebetween, which is graphically shown in the image 80 by a line 86.

In another example, the monitoring system 30 estimates coaxial blade clearance by estimating the image position of individual blades 22 and determining the distance within the image 80 between adjacent blades 22. The distance within the image 80 is correlated with actual distance based on a previous calibration. This estimation measures the distance between the blades, which can approach each other as speed increases. Pitch differences between the blades 22 do not affect the results of this analysis.

In addition to location estimation of aircraft components, the monitoring system 30 can be used to identify objects with an imaging device 34 field of view. For example, the monitoring system 30 can perform image analysis to identify objects such as other aircraft, vehicles on the ground, people, buildings, oil rigs, and other objects or features that can impact the safety of the aircraft 10.

Figure 4:
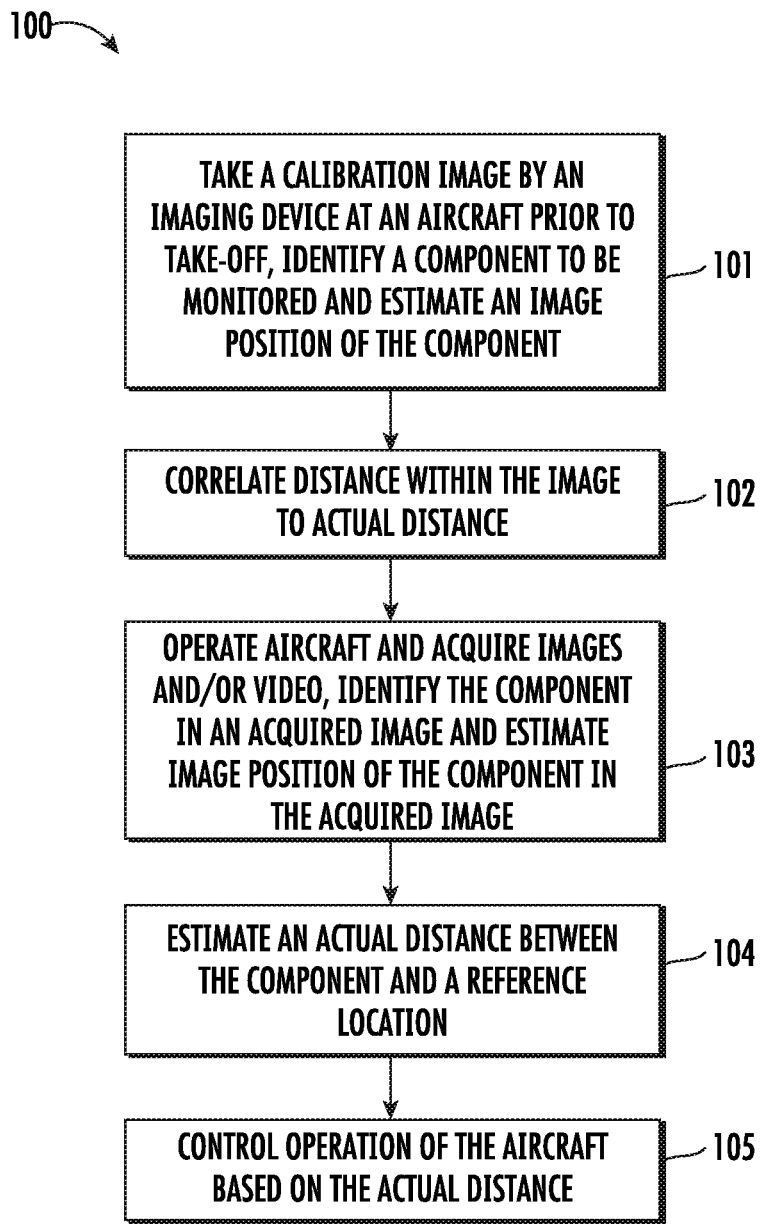
FIG. 4 is a flowchart that depicts an embodiment of a method of monitoring the position of an aircraft component.

FIG. 4 illustrates an embodiment of a method 100 of monitoring position of an aircraft component. The method 100 includes a number of method steps or stages 101-105. The method 100 may be performed as described below and include all of the steps or stages in the order described. The method is not so limited, as the method may include fewer than all of the steps or stages, or may include performing one or more of the steps or stages in a different order than that described below.

In the following description, the monitored aircraft component is a rotary blade 22 or blades 22 of the aircraft 10. It is noted that the method 100 is not limited and can be applied to any aircraft component that is moveable during flight. For example, the method 100 can be applied to monitor deflection of any suitable component of an aircraft, such as a tail component, tail rotor or fixed wing.

In a first stage 101, a calibration image is taken by an imaging device 34 disposed at a selected location relative to the aircraft 10. The calibration image is of a region that includes at least a portion of a blade 22 during rotation of the blades 22 prior to take-off.

The calibration image is analyzed to identify a position within the calibration image of the blade tip 34 (a reference position). The reference position may be represented by a single point or region in the image, or represented by any other suitable graphical element. For example, the reference position can be an arc representing the path of the blade tips.

Image position determination and component identification in an image may be performed in various ways. For example, the processing device utilizes machine learning or artificial intelligence to identify the blade tips 34 and/or other objects depicted by the calibration image. In one embodiment, machine learning logic is used to train the monitoring system 30 in conjunction with, for example, one or more neural networks. Objects in the calibration image may be identified and labeled using, for example, semantic segmentation and/or depth estimation.

In the second stage 102, the calibration image is analyzed to correlate a distance in the image (image distance) and/or position in the image (image position) with an actual distance and/or location. The position in the image may also be defined by azimuth and elevation as well as distance. The actual location and/or distance may be determined using image analysis and/or machine learning.

In the third stage 103, during flight, the imaging device 34 takes images at various times. The images may be taken continuously (e.g., as video frames) or periodically, and analyzed in real time. Images may be analyzed at other times, for example, after flight as part of a post-flight review. The imaging device 34, in one embodiment, takes images using the same or similar aircraft position and orientation that was used to take the calibration image. For each acquired image to be analyzed, the processing device identifies the blade tips 34 in the acquired image, and determines an image position.

A distance within the acquired image between the blade tips 34 and the reference position is estimated. For example, the processing device determines the number of pixels along a linear path in the image between the blade tips 32 and the reference position.

In the fourth stage 104, the actual distance between the blade tips 32 and the reference position is estimated. For example, the number of pixels is correlated with an actual distance.

In the fifth stage 105, the aircraft 10 is operated or controlled based on the estimated actual distance, by a human operator and/or by the flight system 70. For example, the estimated actual distance can be used to feed flight controls for flight control limits, pilot warning and indication, recommend pilot action, and/or inhibit operations if the blades 22 are in a dangerous position. Distance estimations can also be used for flight testing instrumentation such as flapping monitoring systems for dynamic performance and handling qualities testing. Additionally, blade position data can be fed back into dynamic flight controls.

Embodiments described herein present a number of advantages and technical effects. For examples, the embodiments provide a mechanism to effectively determine clearance of aircraft components, such as rotor blade clearance from aircraft structures and clearance regions. Conventional approaches, such as analytical methods and physical markers (e.g., balsa wood wands) do not provide sufficient accuracy to allow for precise blade clearance monitoring. Embodiments described herein allow control systems and human operators to quickly identify potentially unsafe conditions and take appropriate measures.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a location of a component of an aircraft, the method comprising:
    acquiring an image of the component during flight by an imaging device disposed at a selected location relative to the aircraft and oriented along a selected direction relative to an aircraft structure;
    identifying a position of the component within the image;
    estimating a distance in the image between the component and a reference location depicted in the image; and
    estimating an actual location of the component based on the distance in the image, wherein estimating the actual location includes correlating the distance in the image with an actual distance between the component and the reference location.

2. The method of claim 1, wherein the image is an optical image taken by a camera disposed at the aircraft.

3. The method of claim 1, wherein the distance in the image corresponds to a number of pixels along a line connecting the component and the reference location.

4. The method of claim 1, wherein the reference location is a location in the image of an image feature representing a clearance region in a field of view of the imaging device.

5. The method of claim 1, wherein the reference location is a location of structural component of the aircraft.

6. The method of claim 1, further comprising performing a calibration with the imaging device prior to takeoff of the aircraft.

7. The method of claim 6, wherein the calibration includes taking a reference image by the imaging device when the imaging device is at the selected location and is oriented along the selected direction, and correlating pixel width to an actual distance value.

8. The method of claim 1, further comprising controlling operation of the aircraft based on the actual distance.

9. The method of claim 1, wherein the aircraft is a helicopter, the component is a rotor blade, and the position of the component in the image is a position of a blade tip during rotation of the rotor blade.

10. The method of claim 9, wherein the reference location is a location of at least one of a structural component of the aircraft and a selected clearance region depicted by the image.

11. A system for monitoring a location of a component of an aircraft, the system comprising:
    a processor; and
    memory coupled to the processor and comprising computer-executable instructions that, when executed by the processor, cause the processor to perform:
    acquiring an image of the component during flight by an imaging device disposed at a selected location relative to the aircraft and oriented along a selected direction relative to an aircraft structure;
    identifying a position of the component within the image;
    estimating a distance in the image between the component and a reference location depicted in the image; and
    estimating an actual location of the component based on the distance in the image, wherein estimating the actual location includes correlating the distance in the image with an actual distance between the component and the reference location.

12. The system of claim 11, wherein the image is an optical image taken by a camera disposed at the aircraft.

13. The system of claim 11, wherein the distance in the image corresponds to a number of pixels along a line connecting the component and the reference location.

14. The system of claim 11, wherein the reference location is a location in the image of an image feature representing a clearance region in a field of view of the imaging device.

15. The system of claim 11, wherein the reference location is a location of structural component of the aircraft.

16. The system of claim 11, wherein the processor is configured to perform a calibration with the imaging device prior to takeoff of the aircraft.

17. The system of claim 16, wherein the calibration includes taking a reference image by the imaging device when the imaging device is at the selected location and is oriented along the selected direction, and correlating pixel width to an actual distance value.

18. The system of claim 11, wherein the processing device is configured to perform at least one of controlling operation of the aircraft and notifying a human operator based on the actual distance.

19. The system of claim 11, wherein the aircraft is a helicopter, the component is a rotor blade, and the position of the component in the image is a position of a blade tip during rotation of the rotor blade.

20. The system of claim 19, wherein the reference location is a location of at least one of a structural component of the aircraft and a selected clearance region depicted by the image.

* * * * *